United States Patent [19]

Holden

[11] Patent Number: 4,865,362
[45] Date of Patent: Sep. 12, 1989

[54] CONNECTIBLE FLEXIBLE CONVOLUTED TUBING

[75] Inventor: Homer N. Holden, Jackson County, N.C.

[73] Assignee: Dayco Products, Inc., Dayton, Ohio

[21] Appl. No.: 226,918

[22] Filed: Jul. 29, 1988

[51] Int. Cl.$^4$ .................... F16L 9/00; F16L 11/00; F16L 31/00
[52] U.S. Cl. ............................. 285/260; 24/16 PB; 138/109; 285/903; 446/121
[58] Field of Search ................. 285/260, 423, 903; 138/120, 109, 173; 24/16 PB, 30.5 P; 446/121, 99

[56] References Cited

U.S. PATENT DOCUMENTS

| | | | |
|---|---|---|---|
| 319,144 | 6/1885 | Stephens | 285/903 X |
| 2,621,701 | 12/1952 | Galbraith | 285/333 X |
| 3,188,690 | 6/1965 | Zieg | 425/539 X |
| 3,474,162 | 10/1969 | Seckel | 264/150 X |
| 3,727,949 | 4/1973 | Kleykamp et al. | 285/7 |
| 3,802,202 | 4/1974 | Maroschak | 405/49 |
| 3,899,012 | 8/1975 | Sather | 285/260 X |
| 3,926,222 | 12/1975 | Shroy et al. | 138/122 |
| 3,929,359 | 12/1975 | Schmunk et al. | 285/903 X |
| 3,958,425 | 5/1976 | Maroschak | 405/49 |
| 4,174,858 | 11/1979 | Brooks | 285/7 |
| 4,222,594 | 9/1980 | Skinner | 285/903 X |
| 4,683,917 | 8/1987 | Bartholomew | 285/903 X |

FOREIGN PATENT DOCUMENTS

| | | | |
|---|---|---|---|
| 1083755 | 6/1960 | Fed. Rep. of Germany | 285/260 |
| 1247652 | 10/1960 | France | 285/903 |
| 0383949 | 5/1973 | U.S.S.R. | 285/260 |

Primary Examiner—Randolph A. Reese
Assistant Examiner—Paul M. Frechette
Attorney, Agent, or Firm—Joseph V. Tassone

[57] ABSTRACT

Flexible convoluted tubing is made of an elastomeric material in desired lengths in which one end has convolutions with a configuration different from the convolutions at the other end. This enables the ends of each length to be interlocked in order to form a continuous closed hose. Alternatively separate lengths of tubing can be joined by interlocking one end of each length of tubing to the dissimilar end of another length of tubing.

14 Claims, 2 Drawing Sheets

CONNECTIBLE FLEXIBLE CONVOLUTED TUBING

BACKGROUND OF THE INVENTION

1. Field of the Invention

Flexible convoluted or corrugated tubing has many uses. Conventionally, special connectors are secured to the ends of the tubing for attachment to specific devices, such as vacuum cleaners. However, it is sometimes desirable to provide for a more inexpensive and simple attachment, such as when the ends of a given length of tubing are to be attached together to form a closed loop which becomes a hose having a continuous loop. Such an attachment might also be used to attach different lengths of tubing to form an even longer tubing, or a longer hose having a continuous loop.

2. Prior Art Statement

It is known to form flexible convoluted elastomeric tubing or rigid pipes in which convolutions are integrally formed with the wall. It is also known to use the convolutions to attach end connectors to the ends of the hose, or to interlock lengths of tubing or pipes.

U.S. Pat. No. 3,727,949 issued to Kleykamp et al., provides a flexible hose having conventional corrugations, and a fitting having a rearwardly hooked surface which engages the interior of the corrugations of the hose. This provides a locked swivel connection of the fitting with a fluid-tight seal. Once engaged, the fitting is not easily removed.

U.S. Pat. No. 3,926,222, issued to Shroy et al., describes a corrugated tubing used for drain tiles, wherein an integrally molded connector is incorporated at the ends. The connector has discontinuing circumferentially spaced cleats which project outwardly in a radial direction to interlock with the inner corrugations.

U.S. Pat. No. 3,958,425, issued to Maroschak, and its parent patent No. 3,802,202, relate to a rigid plastic drain pipe with a collar integrally formed at one end, interconnecting with a mating end of a similar pipe. There is just enough flexibility in the end of the collar to fit around the mating end.

U.S. Pat. No. 4,174,858, issued to Brooks, teaches a helically convoluted hose adapted to interlock with a hose fitting having discontinuous threaded portions.

SUMMARY OF THE INVENTION

The present invention provides for a simple, economical system of forming flexible, convoluted elastomeric tubing having a cylindrical wall with axially spaced annular circumferentially continuous convolutions integral therewith. By forming the convolutions with different configurations at each end, the convolutions at one end interlock with the convolutions at the other end to form a closed loop continuous hose.

It is a feature of this construction to permit simple disconnection of the ends.

It is another feature of the construction to interconnect one end of a length of tubing to the dissimilar end of a second length of identical tubing, and if desired, to form a continuous hose of two or more lengths.

According to the teachings of this invention, the configuration of the convolutions at one end are of a smaller diameter and have a first surface at approximately right angles to the wall, and a second surface at an angle to the wall; so that the outer surfaces of these convolutions will fit within the inner surfaces of arcuate convolutions at the other end. The connection has good structural integrity while locked, yet is simple to break apart by pulling on the ends. The strength of the coupling can be varied by the number of convolutions that are interengaged.

It is an object of this invention to provide a tubing which permits a simple, yet secure interconnection of its ends to form a closed loop hose, and to be able to disconnect these when desired.

It is a further object to interconnect two or more similar lengths of such tubing.

It is a further object to provide an economical method for manufacturing such tubing.

Other details, objects, uses and advantages of the invention will be readily apparent from the exemplary embodiments presented in the following specification, claims and drawings.

BRIEF DESCRIPTION OF THE DRAWING

The preferred embodiments are shown in the accompanying drawing, in which.

DESCRIPTION OF THE PREFERRED EMBODIMENT

Figure 1:
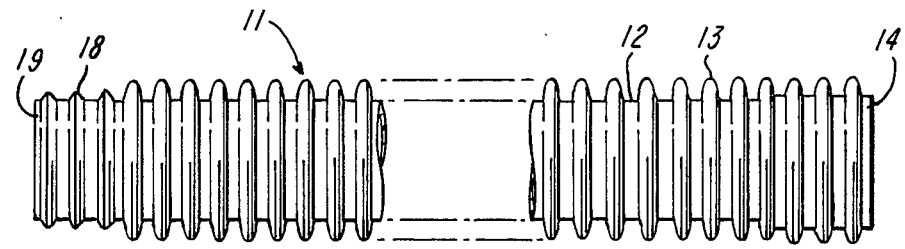
FIG. 1 is an elevational view of a length of flexible, corrugated tubing made according to the present invention.

Referring now to the drawing, FIG. 1 illustrates a length of tubing or hose 11 having a cylindrical wall 12, made of an elastomeric material such as vinyl. The hose is convoluted to form an elongated flexible member, the convolutions being annular and continuous in a circumferential direction and axially spaced, the convolutions being integrally formed with the wall. The tubing may be made by a blow molding process well-known in the art, such as shown by the patent to Zieg, Ser. No. 3,188,690, or the patent to Seckel, Ser. No. 3,474,162. These processes permit continuous formation of the tubing with convolutions of pre-selected configuration and spacing, which may then be cut into desired lengths as described, for example, by Seckel, to form the length 11.

Figure 3:
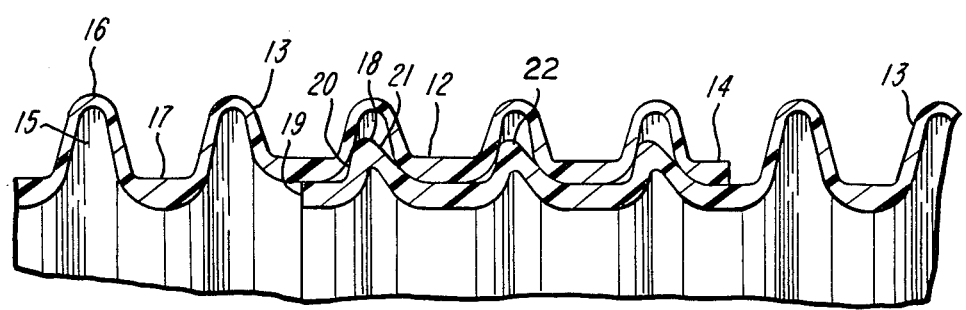
FIG. 3 is an enlarged sectional view of the two ends of the tubing in interlocked position to form the tubing of FIG. 2.

The convolutions are preferably formed throughout the length of the tubing, but may, if desired, be formed only at the ends thereof for purposes explained below. Two different configurations of convolutions are illustrated, the majority of convolutions designated by reference number 13 and located throughout most of the length and comprise a first set of convolutions identical to each other at a first end 14. These convolutions are arcuate in cross-section, and preferably symmetrical in an axial direction. These convolutions are best shown in FIG. 3, and have an inner hollow surface 15 and a crest 16. The convolutions are equally axially spaced and separated by segments 17 of the wall 12.

The convolutions 18 form a second set of convolutions at the other end 19. These are identical to each other, but are different in configuration than convolutions 13, and the end itself has a smaller wall diameter than the diameter of the wall at the first end 14. As seen in FIG. 3, the outer diameter of the wall at end 19 is approximately the same as the inner diameter of the wall at the first end 14. The convolutions 18 are also equally axially spaced, the spacing being approximately equal to the spacing of convolutions 13. The convolutions 18 are asymmetrical and comprise a first surface 20 extending at right angles to the wall 12, and a second surface 21 extending at an angle to the wall in a direction toward the end of the tubing. This angle may vary considerably, but is preferably between 30 and 60 degrees relative to the wall. The convolutions 18 have an outermost tip position 22 which extends radially outward.

Figure 2:
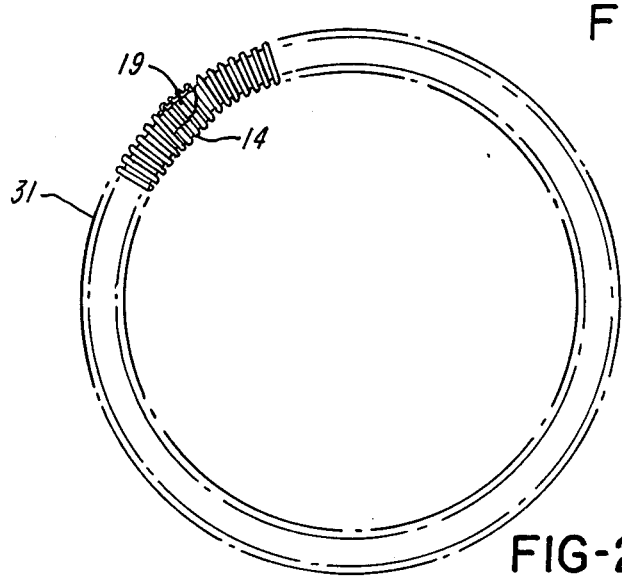
FIG. 2 is an elevational view of the length of tubing interlocked in accordance with the invention, illustrating a closed loop hose.

When it is desired to form a continuous closed loop hose 31 as shown in FIG. 2, the ends of the hose are interlocked by sliding the smaller diameter end 19 into the end 14. The surfaces 21 of convolution 18 slide along the inner surface of the wall segments 17 so that the tip portions 22 fit into the inner surfaces 15 of the convolutions 13. The vertical surfaces 20 lock the convolutions 18 into place within convolutions 13 to form a seal which is enhanced by the fact that the tip portion 22 has a diameter greater than the wall segment 17 of the first end. The angle of surface 21 may be varied to create a tighter or looser interlock. A further variation in interlocking strength is also created by the number of convolutions that are interengaged; FIG. 3 illustrates the engagement of three convolutions 18 within convolution 13, but a looser engagement would result if only one or two convolutions were interlocked. Obviously, a greater number of convolutions 18 could be formed on the end 19, if desired. The interengaged convolutions are thus the only means for forming said interlocked ends.

The flexible, resilient nature of the tubing is such that the ends of the tubing may be disengaged when needed. A closed loop hose such as described herein may be utilized as part of a game or toy; for example, marbles or other objects may be rolled around within the enclosure. The simple engage and disengage feature inherent in the tubing lends itself to versatility of such uses, even by a child.

Figure 4:
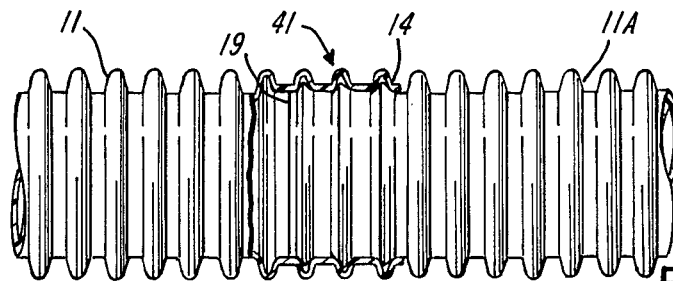
FIG. 4 is an elevational view showing two similar lengths of tubing in interlocked position.
Figure 5:
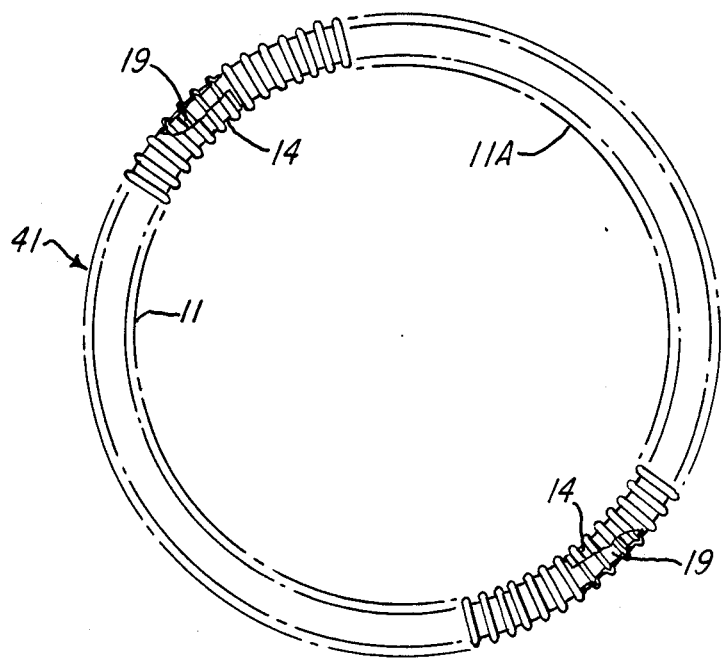
FIG. 5 is an elevational view showing the two similar lengths of tubing of FIG. 4 interlocked to form a closed loop tubing assembly.

As shown in FIG. 4, it may also be desirable to interengage two or more lengths of tubing 11, 11A, either of identical or dissimilar lengths, thus forming a tubing assembly 41. This is done in the same manner as described with reference to FIG. 2, except that the end 19 of length 11A is inserted into the end 14 of the other length 11. This provides for a longer length of tubing if open ends are desired; or a longer closed loop hose similar to the hose 31 as shown in FIG. 5, by interlocking the free ends of lengths 11 and 11A in a similar manner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the term "the improvement" and sets forth what is believed to be new in each claim according to this invention in the portion of each claim that is disposed after the term "the improvement" whereby it is believed that each claim sets forth a novel, useful and unobvious invention within the purview of the Patent Statute.

I claim:

1. In a continuous closed loop hose formed of interlocked ends of a flexible convoluted elastomeric tubing having a cylindrical wall with convolutions integrally formed with said wall; the improvement wherein said convolutions are axially spaced, annular, and circumferentially continuous, and comprise a first set of convolutions identical to each other at one end of said tubing, and a second set of convolutions identical to each other at the other end of said tubing, the wall of said tubing having a greater diameter at said first set then at said second set, the convolutions of said second set having a configuration which is different from the configuration of the convolutions of said first set, at least one convolution of said second set inserted within said at least one convolution of said first set so that the end of said tubing having said second set fits within the end of said tubing having said first set and at least one convolution of each of said first and second sets interengaging each other to form said interlocked ends, wherein said convolutions of said first set are arcuate in cross-section and the convolutions of said second set have a first surface extending approximately at right angles to said wall, and a second surface extending at an angle to said wall, said second surface providing a cam action when said at least one convolution of said second set is inserted into said at least one convolution of said first set, and said first surface provides a locking action for said at least one convolution of said second set, whereby said interengaged convolution are the only means forming said interlocked ends.

2. The hose of claim 1 wherein said second surface extends at an angle of 30 to 60 degrees relative to said wall.

3. The hose of claim 1 wherein the axial spacing of said first and second sets of convolutions are approximately equal.

4. The hose of claim 1 wherein the outermost portions of said convolutions of said second set extend radially outward of said wall of said first set.

5. The hose of claim 1 wherein at least two convolutions of each of said first and second sets are interengaged with each other to improve the interlocked engagement of said ends.

6. In a continuous closed loop hose formed of interlocked ends of a flexible convoluted elastomeric tubing having a cylindrical wall with convolutions integrally formed with said wall; the improvement wherein said convolutions are formed throughout the length thereof and are axially spaced, annular, and circumferentially continuous, and comprise a first set of convolutions identical to each other at one end of said tubing, and a second set of convolutions identical to each other at the other end of said tubing, the convolutions of said second set having a configuration which is different from the configuration of the convolutions of said first set, at least one convolution of each of said first and second sets interengaging each other to form said interlocked ends, whereby said interengaged convolutions are the only means forming said interlocked ends.

7. In a tubing assembly comprising at least two similar interlocked lengths of flexible convoluted elastomeric tubing having a cylindrical wall with convolutions integrally formed with said wall; the improvement wherein said convolutions are axially spaced, annular and circumferentially continuous, and comprise a first set of convolutions identical to each other at one end of each length of tubing, the wall of said tubing having a greater diameter at said first set than at said second set, and a second set of convolutions identical to each other at the other end of each length of tubing, the convolutions of said second set having a configuration which is different from convolutions of said first set, at least one convolution of said second set inserted within at least one convolution of said first set so that the end of said tubing having said second set fits within the end of said tubing having said first set and at least one convolution of said first set of one of said lengths interengaging at least one convolution of said second set of another length to form said interlocked assembly, wherein said convolutions of said first set are arcuate in cross-section and the convolutions of said second set have a first surface extending approximately at right angles to said wall, and a second surface extending at an angle to said wall, said second surface providing a cam action when said at least one convolution of said second set is inserted into said at least one convolution of said first set, and said first surface provides a locking action for said at least one convolution of said second set, whereby said interengaged convolutions are the only means forming said interlocked ends.

8. The tubing assembly of claim 7 wherein said second surface extends at an angle of 30 to 60 degrees relative to said wall.

9. The tubing assembly of claim 7 herein the axial spacing of said first and second sets of convolutions are approximately equal.

10. The tubing assembly of claim 7 wherein the outermost portions of said convolutions of said second set extend radially outward of said wall of said first set.

11. The tubing assembly of claim 7 wherein at least two convolutions of each of said first and second sets are interengaged with each other to improve the interlocked engagement of said ends.

12. In a tubing assembly comprising at least two similar interlocked lengths of flexible convoluted elastomeric tubing having a cylindrical wall with convolutions integrally formed with said wall; the improvement wherein said convolutions are formed throughout the length thereof and are axially spaced, annular and circumferentially continuous, and comprise a first set of convolutions identical to each other at one end of each length of tubing, and a second set of convolutions identical to each other at the other end of each length of tubing, the convolutions of said second set having a configuration which is different from the convolutions of said first set, at least one convolution of said first set of one of said lengths interengaging at least one convolution of said second set of another length to form said interlocked assembly, whereby said interengaged convolutions are the only means forming said interlocked ends.

13. In a method of forming a continuous closed loop hose having interlocked ends including the step of forming a flexible convoluted elastomeric tubing having a cylindrical wall with convolutions integrally formed with said wall; the improvement comprising the steps of forming a first set of axially spaced annular circumferentially continuous convolutions with an arcuate, axially symmetrical cross-section, each having an identical given configuration at one end of said tubing, forming a second set of axially spaced annular circumferentially continuous convolutions with a first surface extending approximately at right angles to said wall and a second surface extending at an angle to said wall, each having an identical configuration at the other end of said tubing which is different from said given configuration, and interengaging at least one convolution of each of said first and second sets with each other to form interlocked ends, whereby said interengaged convolutions are the only means forming said interlocked ends.

14. In a method of making a tubing assembly comprising at least two similar interlocked lengths of flexible convoluted elastomeric tubing by forming said lengths each having a cylindrical wall and a plurality of convolutions integrally with said wall; the improvement comprising the steps of forming a first set of axially spaced annular circumferentially continuous convolutions with an arcuate, axially symmetrical cross-section, each having an identical given configuration at one end of each length; forming a second set of axially spaced annular circumferentially continuous convolutions with a first surface extending approximately at right angles to said wall and a second surface extending at an angle to said wall, each having an identical configuration at the other end of said length which is different from said given configuration, and interengaging at least one convolution of said first set of one of said lengths with at least one convolution of said second set of another length to interlock said lengths, whereby said interengaged convolutions are the only means forming said interlocked ends.

* * * * *